United States Patent [19]

Hueber

[11] Patent Number: 4,520,961
[45] Date of Patent: Jun. 4, 1985

[54] WINDSHIELD WASHING SPRAY WITH JET INCLINATION VARIABLE AS A FUNCTION OF THE SPEED OF THE VEHICLE

[75] Inventor: Francois Hueber, Saint-Louis, France

[73] Assignee: Fabrique de Produits Chimiques, d'Entretien et de Degraissage Ravicolor, S.A., Saint-Louis, France

[21] Appl. No.: 515,480

[22] Filed: Jul. 20, 1983

[30] Foreign Application Priority Data

Jul. 21, 1982 [FR] France .................. 82 13038
Feb. 15, 1983 [FR] France .................. 83 02620

[51] Int. Cl.$^3$ ............................................... B05B 1/10
[52] U.S. Cl. ............................................... 239/284 R
[58] Field of Search ................ 239/284, 284 A, 284 R

[56] References Cited

U.S. PATENT DOCUMENTS 4,390,128  6/1983  Fujikawa et al. ............... 239/284 A

FOREIGN PATENT DOCUMENTS 1580051  3/1970  Fed. Rep. of Germany .
3047396  6/1982  Fed. Rep. of Germany .
1463124  11/1965  France ................ 239/284
2074457  10/1971  France .
2271960  12/1975  France .
1402983  8/1975  United Kingdom ................ 239/284

Primary Examiner—John J. Love
Assistant Examiner—Kevin P. Weldon
Attorney, Agent, or Firm—Young & Thompson

[57] ABSTRACT

Windshield washing spray with jet inclination variable as a function of the speed of the vehicle.

The present invention relates to a windshield washing spray with jet inclination variable as a function of the speed of the vehicle.

Spray characterized in that the body of the spray (1) is mounted on the vehicle body (2) via a thick elastically deformable joint (3) and is provided at its lower part connected to the washing liquid feed conduit (4) with a steel sleeve (5), which is connected by means of a return spring (7), or other elastic member, to a member (6) forming also an end-of-path abutment for said sleeve (5), and secured to a mounting body (8) which is snap-action connected to the vehicle body by means of tongues (9) entering peripheral corresponding openings (10) of the hole (11) for passage of the spray (1), and in that an electromagnet (14) is mounted on the mounting body (8), on the side opposite the return spring (7), positionally adjustably relative to the steel sleeve (5), this electromagnet (14) being controlled by means of an electronic tachymetric device with an adjustable threshold value.

10 Claims, 8 Drawing Figures

WINDSHIELD WASHING SPRAY WITH JET INCLINATION VARIABLE AS A FUNCTION OF THE SPEED OF THE VEHICLE

The present invention relates to the field of automotive vehicle accessories, particularly windshield washers, and has for its object a windshield washing spray with the jet inclination variable as a function of the speed of the vehicle.

At present, windshield washing sprays are generally mounted fixedly on the part of the vehicle body disposed in front of the windshield, by means of a nut through a sealing ring and are connected to a reservoir of washing liquid by means of an electrical or mechanical pump.

The known sprays are most often mounted on vehicles in such a way that at a predetermined speed, for example of the order of 80 km/h, the washing liquid jet reaches about the middle of the zone swept by the windshield wipers.

However, these sprays do not permit effective washing of the windshield when stopped or at low speed, the jet then tending to pass beyond the top of said windshield.

The present invention has for its object to overcome these disadvantages.

Thus it has for its object a windshield washing spray with the jet inclination variable as a function of the speed of the vehicle, characterized in that the body of the spray is mounted on the vehicle body through a thick elastically deformable joint and is provided at its lower portion connected to the supply conduit for washing liquid, with a steel sleeve which is connected by means of a return spring or other elastic element to a member which also comprises a limiting abutment for said sleeve, and is secured to a mounting body with a snap connection to the vehicle body by means of tongues that penetrate peripheral openings corresponding to the passage hole of the spray, and in that an electromagnet is mounted on the mounting body, at the side opposite the return spring, regulably as to position with respect to the steel sleeve, this electromagnet being controlled by means of an electronic tachometer whose threshold value is regulable.

According to a modified form of the invention, the spray body is provided below its base with two diametrically opposed pivotal mountings carried by the chassis, and its sealing at the level of this latter is effected by means of a bellows joint fixed to the base, the pivotal guidance of the spray, without possibility of rotation, being effected by means of diametrically opposed flats on the steel sleeve, surrounding the supply conduit for the washing liquid, coacting with lateral edges of a rectangular recess in the mounting body.

According to another characteristic of the invention, the electromagnet for actuating the spray is fixed on the mounting body by means of a clamp, its positioning and adjustment being achieved by means of transverse ribs provided on the common applicator faces of the mounting body and the frame of the electromagnet, lateral flanges on the frame of this latter coacting with edges of the mounting body to prevent positional deviation of said electromagnet, and a mounting tongue being provided on the opposite side of the mounting body for connecting the return spring of the sleeve of the jet.

According to another modified embodiment of the invention, each spray is fixed, and is duplicated by a second spray having a jet of a different direction in a vertical plane, and the sprays are fed by means of an electromagnetic valve with three passageways for two directions, one of the passageways of the valve corresponding to the jet required for low speed, and the other to the jet required for high speed.

According to another characteristic of the invention, each spray is a spray with two outlets, either disposed horizontally side by side and having between them an angular offset in a vertical plane, or disposed vertically one above the other with different jet inclinations in the vertical plane, each outlet of the spray being branched to a passage of an electromagnetic valve whose valve member has three passages for two directions.

According to another modified form of the invention, each spray is a vertical spray with two outlets having jets of different directions in the vertical plane, in which is disposed an electromagnetically controlled distributing slide valve connected to a feed conduit.

The invention will be better understood from the following description, which relates to preferred embodiments, given by way of non-limiting examples and explained with reference to the accompanying schematic drawings, in which.

Figure 1:
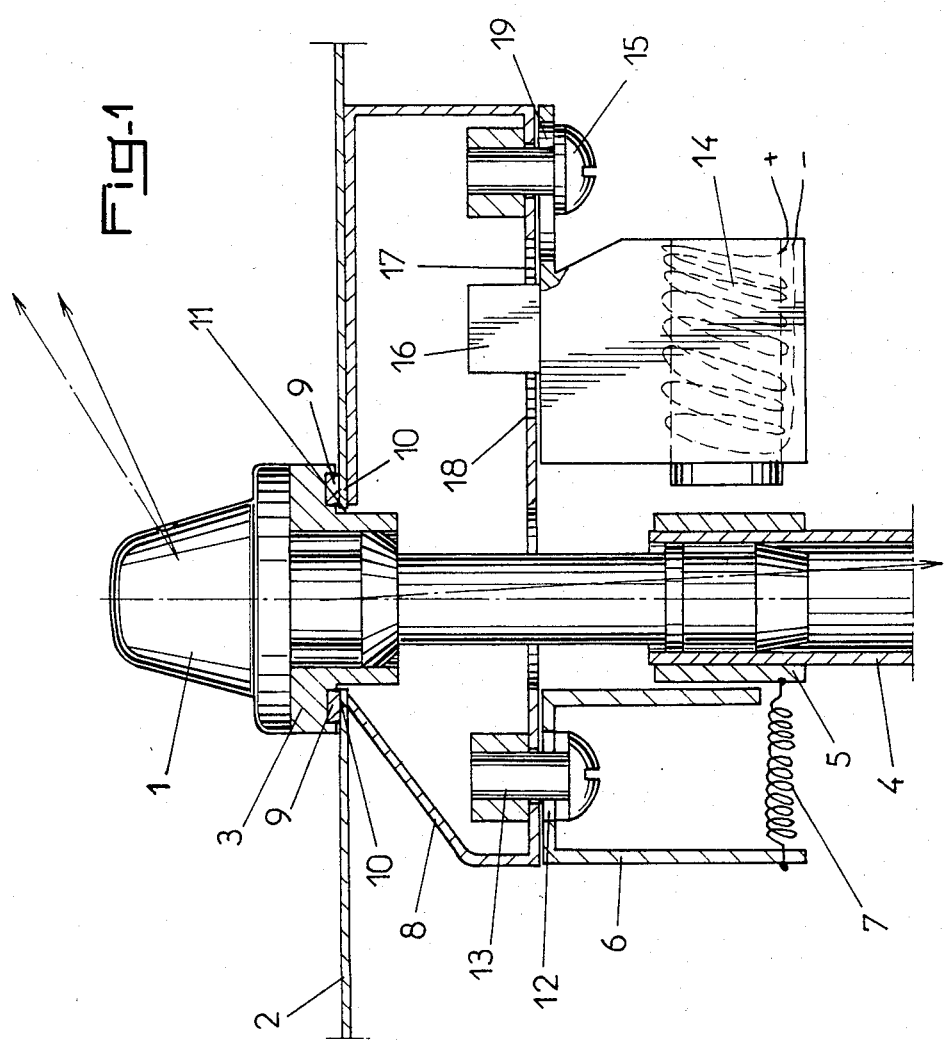
FIG. 1 is a cross-sectional view of a spray according to the invention.

According to the invention, and as shown more particularly, by way of example, in FIG. 1 of the accompanying drawings, the windshield spray 1 is mounted by its body on the vehicle body 2 via a thick elastic deformable joint 3.

In its lower part for connection to the wash liquid inlet supply conduit 4, the spray 1 is provided with a steel sleeve 5 which is connected to a member 6 by means of a return spring 7, or other elastic member.

Member 6 also provides an end-of-path abutment for sleeve 5 and is snap-fitted to a mounting body 8, which is connected to the vehicle body by means of tongues 9 coacting with peripheral recesses 10 of the hole 11 for passage of the spray 1.

Member 6 is preferably mounted on the body 8 in an adjustable manner for translation with respect to valve 1 and to its sleeve 5 by means of an oblong hole 12 in the bearing face of said member 6 on the body 8, the assembly of element 6 and body 8 being effected by means of a screw-nut assembly 13. Thanks to this construction, the position of jet 1 for washing the windshield when the vehicle is stopped or is at low speed may be precisely adjusted so as to achieve optimum conditions of impact on the windshield by the jet emitted by spray 1. The direction of the jet thus obtained is represented by a fine line arrow in FIG. 1.

On body 8 is also secured an electromagnet 14 by means of a screw-nut assembly 15. This electromagnet 14 is provided at its base with elastic tongues 16 coacting with adjusting notches 17 of a longitudinal recess 18 of body 8 and with an oblong hole 19 for passage of the securement screw of assembly 15. Thanks to these tongues 16, the notches 17 and the oblong hole 19, it is possible to provide precise regulation of the path of sleeve 5 upon excitation of the electromagnet 14 to limit the pivoting of the spray 1, and thus the inclination of its jet to a predetermined value. The pivoting of the spray 1 and the corresponding direction of the jet are represented by broken line arrows.

The adjustment notches 17 are preferably provided to permit adjustment of the pivoting corresponding to a predetermined speed and to a given angle of inclination of the windshield. Thus, the adjustment of the position of the electromagnet 14 is effected as a function of the type of vehicle or according to a code corresponding to a given type of vehicle.

Figure 2:
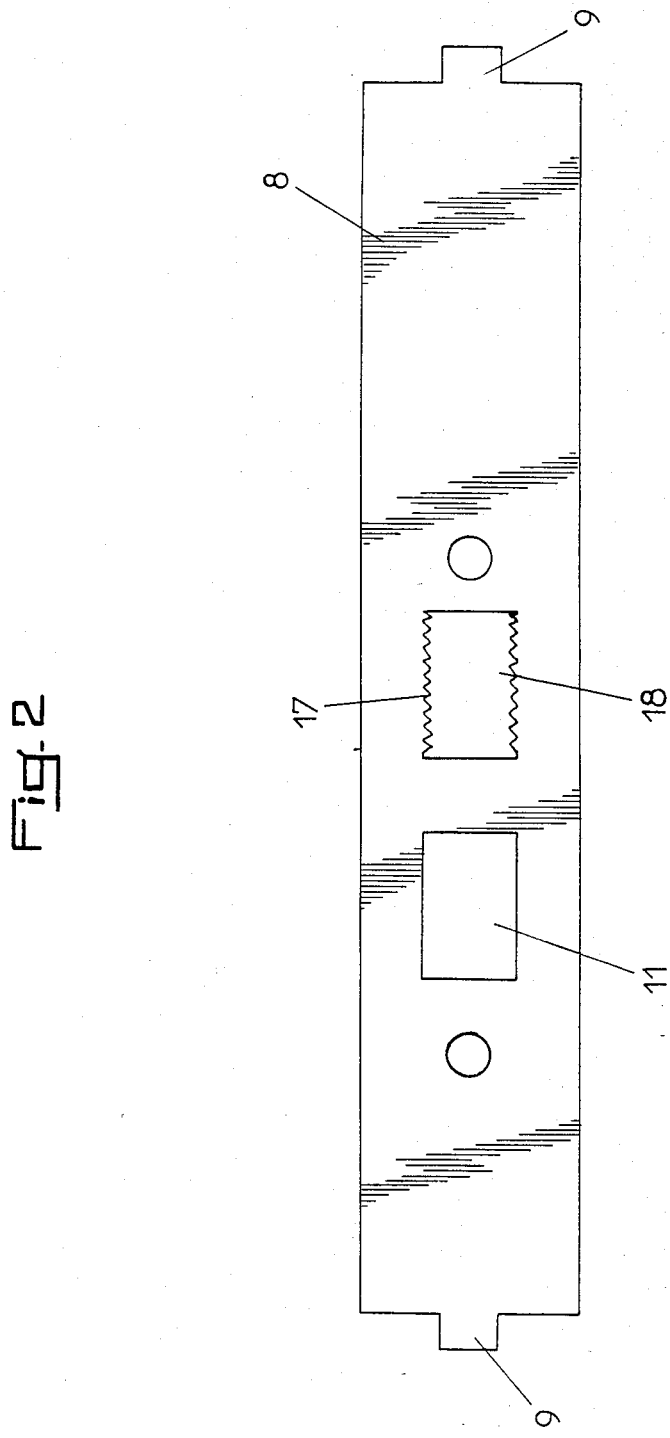
FIG. 2 is a developed plan view, on a smaller scale, of the mounting body.

The body 8 for snap mounting is preferably constituted by sheet metal stamped and bent and having elastic properties. This sheet metal is shown, in its unbent state after stamping, in FIG. 2. The body 8 may also be constituted by a rigid synthetic material reinforced or not with glass fibers, and having elastic characteristics.

Thanks to such a construction of body 8, the latter can easily be mounted on the vehicle body 2 with the members that are associated with it.

The control of the electromagnet 14 is preferably effected by means of an electronic tachymetric device (not shown) which electronically counts the turns and can be adjusted to a predetermined threshold value. Thus, as soon as this threshold value is achieved and/or exceeded, an actuation impulse for the electromagnet 14 is delivered, and the device for timing or locking maintains said electromagnet 14 in its operative condition. The spray 1 is then pivoted by the attraction of the sleeve 5 against the action of spring 7. When the value reached by the tachymetric device falls below the predetermined threshold value, the feed to the electromagnet 14 is interrupted and the spray 1 is returned to its rest position by the return spring 7.

The control of the electromagnet may be effected directly by the tachymetric device, or by interposition of a closure contact actuated simultaneously with a control of the windshield washer pump. By the use of this last arrangement, the duration of operation of the electromagnet is reduced to a minimum, whereby the risk of damage from overheating is practically nil.

According to another modified form of the invention, the control of the electromagnet 14 can also be effectuated by means of an impulse counter connected to the transmission shaft of the gear box of the vehicle.

The pivoting of the spray 1 on the vehicle body 2 is made possible by the thick elastically deformable joint 3, which can be temporarily collapsed at one point on its circumference, and which ultimately resumes its initial shape while ensuring a seal at the level of hole 11.

Figure 3:
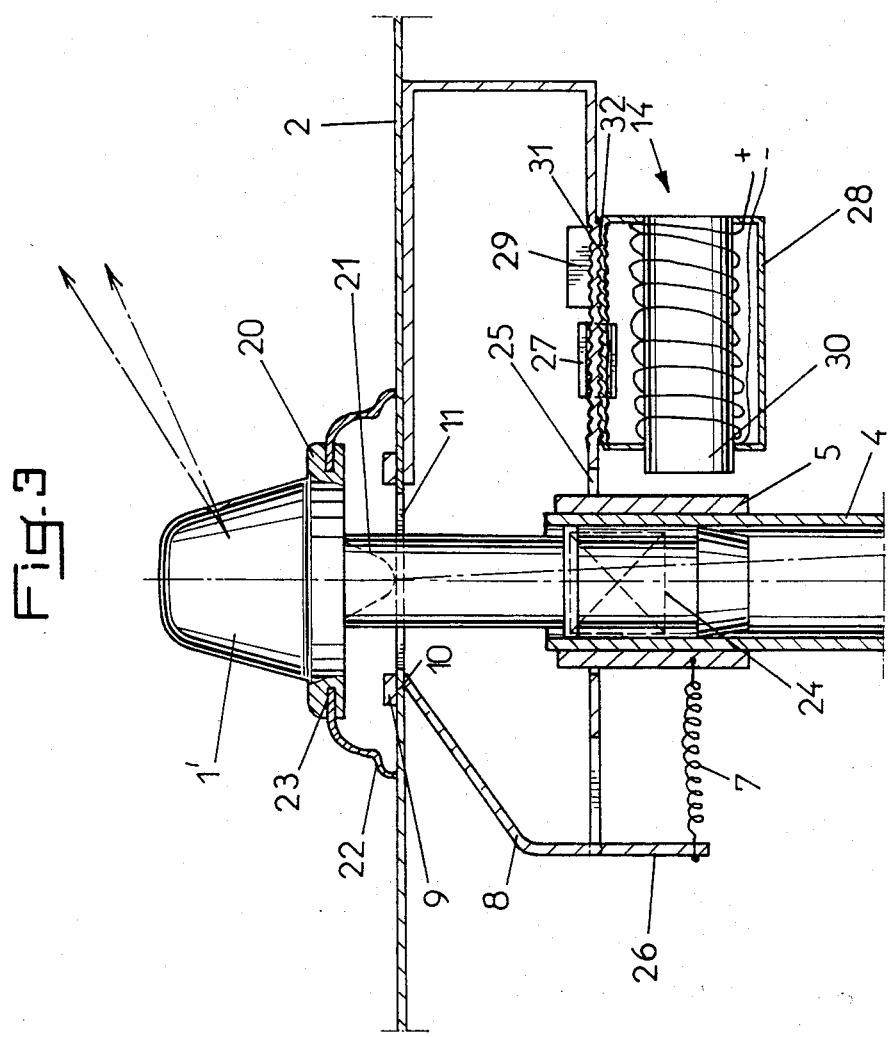
FIG. 3 is a side elevational and cross-sectional view of a modified form of the invention.

According to a modified form of the invention, and as shown in FIG. 3, the body of the spray 1' is provided beneath its base 20 with two diametrically opposed pivotal bearings 21 bearing on the vehicle body 2 on opposite sides of hole 11 for passage of the spray, and the base 20 is provided with a bellows joint 22 mounted in a peripheral throat 23, and bears on the chassis 2. The guidance of jet 1', when pivoting, without the possibility of rotation, is realized thanks to diametrically opposed flats 24 on the steel sleeve 5, surrounding the supply conduit 4 for the washing liquid, these flats 24 coacting with the lateral edges of a rectangular recess 25 in the mounting body 8.

This latter, which is secured by means of tongues 9 entering the recesses 10 of hole 11 for passage of the spray 1', is provided with a tongue 26 for mounting spring 7 which returns sleeve 5 of the spray to its rest position, the abutment for said sleeve in this position being provided by the corresponding transverse edge of the rectangular opening 24. Such an abutment is possible thanks to the utilization of a spray with a perforated adjustable ball permitting an adjustment of the jet direction, in the rest position, by simple adjustment of the position of the ball by means of a pin or the like.

The electromagnet 14 for actuating the spray 1' is secured on the mounting body 8, on the opposite side of tongue 26, by means of a clamp 27 gripping its frame 28 against the lower face of body 8, and the maintenance in position and the adjustment with respect to sleeve 5 are achieved by means of transverse ribs 31 and 32 provided on the mutual contact faces of the body 8 and frame 28, variation in the position of electromagnet 14 being prevented by the provision of lateral flanges 29 on the frame 28, which coact with edges of the mounting body 8, and the core 30 of the electromagnet 14 comprises the end-of-path abutment for the pivoting of the spray 1'.

Thanks to this arrangement the construction of the windshield washing spray is particularly simplified, no longer requiring complicated control and adjustment members.

According to another characteristic of the invention, the control of electromagnet 14 is effected by means of a pressure meter (not shown) mounted on the forward side of the vehicle and preferably secured to the chassis, and releasing said electromagnet 14 upon the occurrence of a given differential pressure corresponding to the relative speed of the wind.

Thus, if the electromagnet must draw the sleeve 5 against its core 30, at a speed of 80 km/h, to effect adequate pivoting of the spray 1', the pressure meter takes account of the actual speed of the wind and the speed of the vehicle, which is thus a speed relative to the wind. Thus, for zero wind speed, if the vehicle is moving at 80 km/h, the pressure meter actuates the electromagnet in the same manner as if the vehicle were standing still and the wind were moving at 80 km/h. Likewise, the pressure meter takes account of all the wind speeds during movement of the vehicle to control or not the pivoting of the spray 1'.

The use of a pressure meter permits obtaining a control device of low cost, of high reliability, and transmitting with fidelity the actual conditions.

Figure 4:
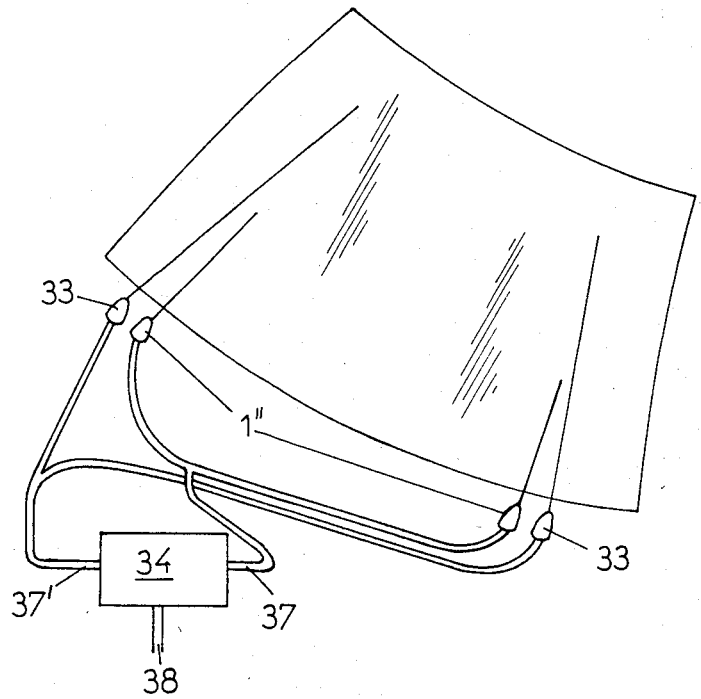
FIG. 4 is a schematic view of an arrangement of jets according to the invention coacting with a distribution valve.
Figure 6:
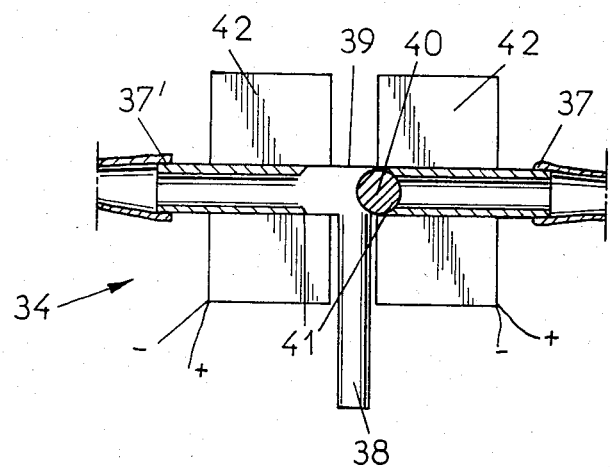
FIG. 6 is a cross-sectional view of an electromagnetic valve with three passages for two directions according to the invention.

According to another modified form of the invention, and as shown more particularly by way of example in FIG. 4 of the accompanying drawings, each spray 1" is stationary and is backed up by a second spray 33 which throws a jet in a different direction in a vertical plane. These sprays 1" and 33 are fed by means of an electromagnetic ball valve 34 with three passages for two directions, which will be described in greater detail hereinafter with reference to FIG. 6. In this embodiment, one of the passages 37 of valve 34 is connected to the sprays 1" corresponding, for example, to the jets required for low speed, while the other passage 37' is connected to the sprays 33 adapted to deliver jets for high speed.

Figure 5:
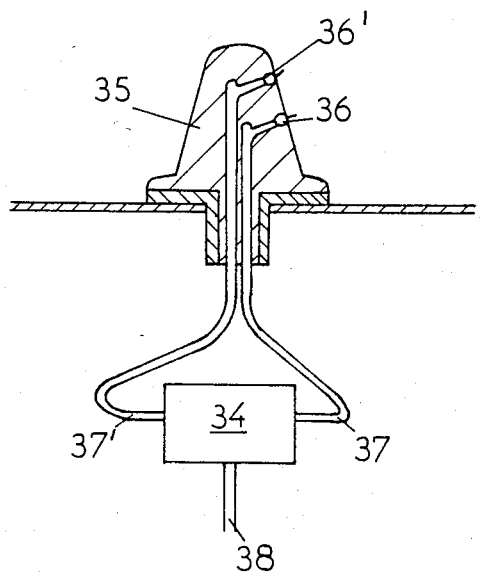
FIG. 5 is a cross-sectional view of a modification of FIG. 4.

It is also possible, as shown in FIG. 5, to feed by means of valve 34 sprays 35 having each two outlets 36—36', which may be either disposed horizontally side by side with an angular offset in a vertical plane, or disposed vertically (the case of FIG. 5) one, 36', above the other, 36, with different jet inclinations. In this embodiment, each outlet 36, 36' of the sprays 35 is connected to a corresponding passage 37, 37' of valve 34.

This latter (FIG. 6) is preferably embodied as a body having an inlet opening 38 and two outlet openings corresponding to the passages 37 and 37', aligned with each other and connected by a channel 39 into which empties the channel in prolongation of the inlet orifice 38, this channel 39 containing an iron ball 40, coated with a protective layer against corrosion, which bears in its end positions against an outlet 41 provided on each side of channel 39, on opposite sides of the channel of orifice 38, under the influence of the magnetic field developed by a corresponding winding 42, and thus closes the passage 37 or 37'.

The control of the electromagnetic ball valve 34 is preferably effected by means of a two-position switch which automatically returns to its rest position, which permits the energization of winding 42 corresponding to the passage 37 in one of its positions, and the energization of the other winding 42 corresponding to the other passage 37' in the other position, as well as also the control of the washing liquid pump. Thus, in the first case, the ball 40 is applied against the outlet 41 and closes the passage 37, while in the other case it is applied to the other outlet 41 and closes the passage 37'.

According to the speed of the vehicle and the required inclination of the jet, the conductor may thus actuate as desired its control switch and thus the valve 34.

Figure 7:
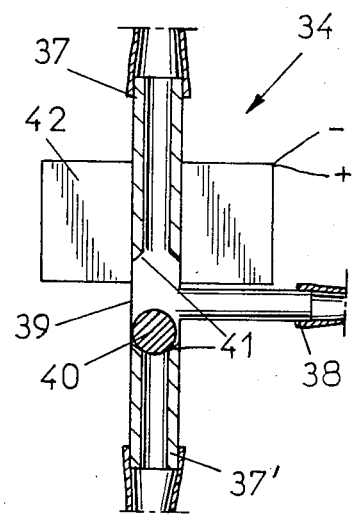
FIG. 7 is a view similar to that of FIG. 6 of a modified form of the valve.

FIG. 7 shows a modified form of the valve 34, in which only the part of the channel 39 corresponding to one of the passages (for example 37) is surrounded by a winding 42, the channel 39 being thus disposed vertically with the winding 42 about its upper part, the ball 40 being applied against the outlet 41 of the other passage (for example 37') under the influence of its own weight in the rest position of the winding 42. Thus, the use of one of the positions of the spray will require only the actuation of the washing liquid pump by means of the switch, while the other sprays will require the simultaneous actuation of said pump and the winding 42.

Figure 8:
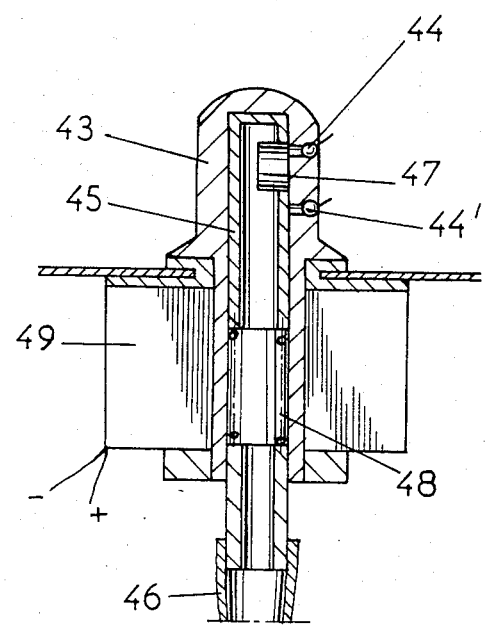
FIG. 8 is a cross-sectional view of another modified form of the invention.

FIG. 8 shows another modified form of the invention, in which the spray 43 is a vertical spray with two outlets 44—44' with different jet directions in a vertical plane, and this spray 43 housing an electromagnetically controlled distribution slide valve 45 which is connected to a feed conduit 46.

The body of spray 43 contains in its base a winding 49 surrounding the housing of the valve slide 45 and adapted to draw the latter downwardly against the action of spring 48, during energization of said winding 49, by means of a switch with two working positions and automatic restoration to rest position, by the driver of the vehicle.

The control switch of winding 49 preferably has a first position for actuating only the washing liquid pump, and a second position for simultaneously actuating said pump and energizing the winding 49, it being possible also to reverse these actuating positions.

Thus, in the rest position of the slide valve 45, in which its slot 47 communicates with the outlet 44 of the corresponding spray 43, for example, for the delivery of a high velocity jet, it suffices that the driver actuate the control switch to put it in its first position to effect the correct washing. To change to washing at low speed of the vehicle, the driver moves the switch to its second position, in which the winding 47 draws the slide 45 against the spring 48 to bring the slot of this latter into registry with the outlet 44' corresponding to a jet of different direction from the first. As soon as the switch is released, the winding 49 is no longer energized, and the slide valve 45 rises again to its initial position under the influence of spring 48 acting in concert with the force of the pressure prevailing in the slide valve 45 and the feed conduit 46.

Thanks to this invention, it is possible to provide a spray permitting complete washing of the windshield, no matter what the vehicle speed, by taking into account said speed, and the appropriate parameters for each vehicle or type of vehicle.

Of course, the invention is not limited to the embodiments described and shown in the accompanying drawings. Modifications remain possible, particularly with respect to the construction of the various members, or by the substitution of technical equivalents, without thereby departing from the scope of protection of the invention.

I claim:

1. A windshield washing spray with jet inclination variable as a function of the speed of the vehicle, comprising a first fixed spray (1") adapted to direct a jet of washing liquid at a relatively low portion of a windshield, a second fixed spray (33) adapted to direct washing liquid at a relatively high portion of a windshield, an electromagnetic ball valve (34) having an inlet orifice (38) supplying said washing liquid to said valve, a first outlet passage for supplying said liquid to said first spray (1") and a second outlet passage (37') for supplying said liquid to said second spray (33), and means responsive to the speed of the vehicle to actuate said valve (34) so that said liquid passes from said inlet orifice (38) to said first outlet passage (37) at relatively low speed of the vehicle and from said inlet orifice (38) to said second outlet passage (37') at relatively high speed of the vehicle.

2. Spray according to claim 1, characterized in that each spray (35) is a spray with two outlets (36—36') disposed horizontally side-by-side and having them an angular offset in a vertical plane, each outlet of the spray being connected to a passage (37—37') of said electromagnetic ball valve (34) with three passages for two directions.

3. Spray according to claim 1, characterized in that each spray (35) is a spray with two outlets (36—36') disposed vertically one above the other with different jet inclinations in the vertical plane, each outlet of the spray being connected to a passage (37—37') of said electromagnetic ball valve (34) with three passages for two directions.

4. Spray according to claim 1, characterized in that the electromagnetic ball valve (34) is in the form of a body having an inlet orifice (38) and two outlet orifices corresponding to the two passages (37) and (37') which are aligned and connected by a channel (39) into which opens the channel prolonging the inlet orifice (38), this channel (39) containing a metal ball (40) which bears in its extreme positions against an outlet (41) provided on each side of the channel (39), and on opposite sides of the channel of the orifice (38), under the influence of the magnetic field developed by the corresponding winding (42), and closes also the passage (37) or the passage (37').

5. Spray according to claim 4, characterized in that the portion of the channel (39) corresponding to one of the passages is surrounded by a winding (42), the channel (39) being thus disposed vertically with the winding (42) about its upper part, the ball (40) being applied against the outlet (41) of the other passage under the influence of its own weight in the unactuated condition of the winding (42).

6. Spray according to claim 1, characterized in that the control of the electromagnetic ball valve (34) is effected by means of a two-position switch with automatic return to rest position, which permits the energization of the winding (42) corresponding to the first passage (37) in one of its positions, and the energization of the other winding (42) corresponding to the other passage (37') in the second position, as well as simultaneously the control of the washing liquid pump.

7. Spray according to claim 1, characterized in that each spray (43) is a vertical spray with two outlets (44—44') with jets in different directions in the vertical plane, in which is disposed a distribution slide valve (45) with electromagnetic control connected to a feed conduit (46).

8. Spray according to claim 7, characterized in that the slide valve (45) is of iron with an anti-corrosion coating, and is in the form of a hollow body open at its lower portion in communication with the feed conduit (46), provided at its upper portion with a horizontal slot (47) for liquid outlet, and engaged at its lower end by a return spring (48).

9. Spray according to claim 7, characterized in that the body of the spray (43) contains in its base a winding (49) surrounding the housing of the slide valve (45) and adapted to draw the latter downwardly against the action of the spring (48), during energization of said winding (49), by means of a switch with two operative positions with automatic return to rest position, by the driver of the vehicle.

10. Spray according to claim 9, characterized in that the control switch of the winding (49) has a first position only for actuating the washing liquid pump, and a second position for simultaneously actuating said pump and energizing the winding (49), these active positions being adapted to be reversed.

* * * * *